(No Model.)

G. T. CULVER.
HACK SAW.

No. 558,781.  Patented Apr. 21, 1896.

Witnesses:
Frank Saward
Wm. H. Cooper

Inventor
Geo. T. Culver

UNITED STATES PATENT OFFICE.

GEORGE T. CULVER, OF NEW HAVEN, CONNECTICUT.

HACK-SAW.

SPECIFICATION forming part of Letters Patent No. 558,781, dated April 21, 1896.

Application filed July 17, 1894. Serial No. 517,832. (No model.)

*To all whom it may concern:*

Be it known that I, GEORGE T. CULVER, a citizen of the United States, residing at New Haven, county of New Haven, and State of Connecticut, have invented a new and useful Improvement in Hack-Saws, of which the following is a specification, reference being had to the accompanying drawings, forming part thereof.

My invention relates to that form of hand-saws known as "hack-saws;" and it has for its object to provide the frame of such a saw with means for holding the blade thereto which will permit the blade to be removed from and replaced upon the frame by a quick and easy movement, which will enable the blade to be securely held in various positions upon the frame and to be changed from one position to the other by disconnecting one end thereof merely, and which will avoid the use of clamping-screws and similar devices which are liable to become detached from the frame and lost.

To these ends my invention consists in the hack-saw constructed and operating as hereinafter fully described, and particularly pointed out in the claims.

Figure 1:
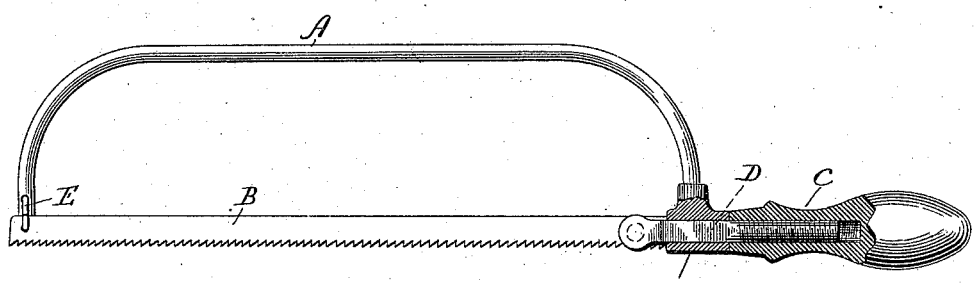
Figure 2:
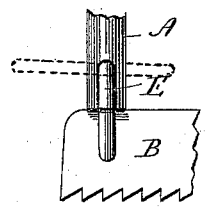
Figure 3:
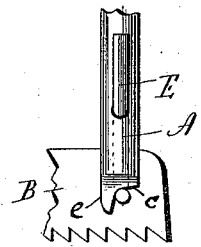
Figure 4:
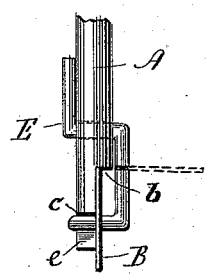
Figure 5:
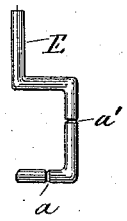

Referring to the drawings, in which like letters designate like parts in the several figures, Figure 1 is a side view of a hack-saw embodying my invention with the handle portion thereof partly broken away. Fig. 2 is an enlarged view of a portion of the blade and the outer end of the frame and showing the means devised by me for securing the former to the latter. Fig. 3 is a similar view of the same parts, viewed from the side opposite to that shown in Fig. 2. Fig. 4 is a similar view of the same parts, looking toward the end of the frame. Fig. 5 is a view of the clamping-hook detached.

The letter A designates the bow-shaped frame, which terminates at its rear end in the bearing-block F, in which is an opening or socket to receive the eyebolt D. Said eyebolt has its head provided with a laterally-projecting stud, which enters a hole in the blade B, and has that portion of its shank which rests in the socket in block F made rectangular or of other angular shape in cross-section, the socket being of a similar shape to prevent rotation of the bolt within the socket, and has the outer end of said shank threaded to receive the internally-threaded handle C. At its front end the frame A is provided with a recess at one side thereof, extending rearwardly for a distance somewhat less than the width of blade B and terminating in the shoulder *b*, and with a shorter transverse recess in its front side, which terminates in the shoulder *c* and forms the depending lug *e* at its rear side. (See Figs. 3 and 4.) Said frame is also provided with a hole extending transversely therethrough a short distance above the shoulder *b* to receive the pivoted clamping hook or staple E. Said clamping-hook is composed of a short length of stiff-wire rod of U shape having the leg thereof which is passed through the hole in the frame of greater length than its opposite leg, and having said longer leg bent rearwardly to a position parallel with the frame after being passed through the latter, as shown in Fig. 4. Said hook is thus permanently secured to the frame, while being free to turn to carry its shorter leg outwardly to a position where it clears the end of the frame, as represented by broken lines in Fig. 2.

The blade B is provided with a hole near its outer end to receive the hook E, and the latter is preferably provided with two grooves or notches *a a'*, the hole in said blade being so located that when the latter occupies the notch or groove *a* the inner edge of the blade will rest against the shoulder *b*, as shown by full lines in Figs. 1, 2, 3, and 4, and when it occupies the notch or groove *a'* its inner side will rest against said shoulder, the blade then standing transversely with respect to the frame, as represented by broken lines in Fig. 4, with its teeth facing toward the right or left, as may be desired.

While I prefer, as stated, to provide the hook E with the notches or grooves *a a'*, as they assist in holding the blade from lateral movement, said notches or grooves are not essential to a correct operation of the saw-clamping means. By producing sufficient tension upon the blade, by means of the handle C and eyebolt D, a clamping-hook E without notches or grooves can be used and the blade still be held rigidly in the frame, and such plain form of hook will be employed when a plurality of blades are used at once, as hereinafter described.

To apply the blade to the frame, the pivoted clamping-hook E is swung to the position shown by broken lines in Fig. 2 and the short leg thereof is inserted in the hole at the front end of the blade, after which the hook is swung back to its normal position with its short leg resting against the lug e, which serves as a stop therefor. The stud on eyebolt D is then inserted in the hole at the rear end of the blade and the handle is turned in a direction to cause its threaded portion, by its action upon the threaded portion of the shank of said bolt, to draw the latter through the socket in block F until the desired amount of tension upon the blade is secured, the angular portion of said shank by its engagement with the angular socket preventing the belt from turning with the handle, while permitting free endwise movement of the bolt. The handle has its bearing against the rear end of the block F, and, as herein shown, is composed of metal; but a wood handle having seated therein a nut to engage the threaded shank of the hook can be employed if desired. To remove the blade, it is necessary simply to reverse these movements, and it will be noted that both operations can be performed very quickly and conveniently. To change the blade to a transverse position, with its teeth facing toward the left when the saw is held in the hand, it is necessary simply to loosen the eyebolt by turning the handle until its angular portion clears the socket and impart a quarter turn thereto, swing the clamping-hook to its open position, change the blade from the notch a to the notch a', and then tighten the blade as before. If it is desired to have the teeth of the blade face in the opposite direction it, is slipped off from the hook and reversed and then replaced and tightened, as before described.

It will be observed that I thus provide for four positions of the blade—that is to say, with its teeth facing outwardly, as shown in Fig. 1, in a directly opposite direction or toward the frame, and toward either the right or the left when standing transversely to the frame—thereby rendering the saw capable of a vast variety of uses, the blade being clamped equally tight in either of said positions.

By using the pivoted clamping-hook E for connecting the front end of the blade to the frame I not only provide for a very quick and convenient coupling and uncoupling of the blade, as compared with the thumb-screw devices usually employed, but I provide a fastening means which cannot become disconnected from the frame and lost or mislaid, as frequently happens with such previous forms of means, and one which can be manufactured at a comparatively trifling cost. The means by which I obtain the tension upon the blade, as herein described, are also extremely simple and inexpensive, while possessed of great strength and durability and easily operated.

Another important advantage incident to the use of the form of clamping-hook E herein described as the means for connecting the front end of the blade to the frame is that it enables me to use a plurality of blades at once in the same frame without any change in the clamping means, said blades being placed side by side and applied to the frame in the same manner as hereinbefore described with respect to a single blade. A slot or groove corresponding in width to the thickness of two or three blades can thus be cut, and the range of usefulness of the tool is thereby greatly increased.

Having thus fully described my invention, what I claim, and desire to secure by Letters Patent, is—

1. In a hack-saw, the combination with a frame having at its front end the recesses and shoulders b and c and lug e as described, of a substantially U-shaped clamping-hook having one leg thereof passing loosely through a hole in said frame near said front end, a blade having at its front end a hole to receive the opposite leg of said hook, and means for securing the rear end of said blade to said frame and for producing tension thereon longitudinally, substantially as described.

2. In a hack-saw, the combination with frame A provided with the socket-block F at its rear end and having the recesses and shoulders b and c and lug e at its front end as described, of the clamping-hook E shaped as described and provided with the notches or grooves a a', blade B, eyebolt D, and handle C, arranged and operating substantially as set forth.

GEORGE T. CULVER.

Witnesses:
FRANK SEWARD,
S. C. REILLY.